United States Patent [19]

Coble

[11] Patent Number: 5,404,795
[45] Date of Patent: Apr. 11, 1995

[54] BARBEQUE GRILL

[76] Inventor: Wayne R. Coble, 532 W. Main St., Box 2826, Gibsonville, N.C. 27249

[21] Appl. No.: 219,081

[22] Filed: Mar. 28, 1994

[51] Int. Cl.$^6$ .................... A47J 37/00; A47J 37/04
[52] U.S. Cl. ..................................... 99/339; 99/345; 99/448; 99/450; 126/25 R; 126/332; 126/334
[58] Field of Search .................. 99/339, 448, 450, 482, 99/345–347, 449; 126/25 R, 9 R, 9 B, 41 R, 334–338; 312/273, 274

[56] References Cited

U.S. PATENT DOCUMENTS

| | | | |
|---|---|---|---|
| 3,617,022 | 11/1971 | Wiggins | 126/25 R |
| 3,688,758 | 9/1972 | Stephen, Jr. | 126/41 R |
| 3,692,012 | 9/1972 | Wiggins | 126/25 R |
| 3,938,495 | 2/1976 | Bauer et al. | 126/41 R |
| 4,108,141 | 8/1978 | Bauer | 99/340 |
| 4,362,093 | 12/1982 | Griscom | 99/339 |
| 4,667,652 | 5/1987 | Bunton | 99/450 |
| 4,729,364 | 3/1988 | Dailey | 126/41 R |
| 4,979,437 | 12/1990 | Giebel | 99/448 |
| 5,031,602 | 7/1991 | Vick | 99/339 |
| 5,070,776 | 12/1991 | Schlosser et al. | 126/334 |

Primary Examiner—Timothy F. Simone

[57] ABSTRACT

A barbecue grill assembly adapted for simultaneously cooking one food and warming another, the grill comprising a base component having an upper portion and lower portion, a rearward end, a forward end, and two side walls extending between the rearward and forward ends, an opened top, and a closed bottom, the base component having a charcoal rack positioned within lower portion, the base component further having a food rack positioned above the charcoal rack; a lid component having an upper portion, a lower portion, a rearward end, a forward end, and two side walls extending between the forward and rearward ends, a closed top and an opened bottom, rack receiving means positioned upon the side walls of the lid component; an upper lid rack adapted to be received within the upper rack receiving means of the lid component; and a lower lid rack adapted to be received within the rack receiving means of the lid component, the distance between the upper lid rack and the lower lid rack being such that food items may be secured between the upper and lower lid racks, the space between the upper and lower lid racks defining a warming zone.

6 Claims, 4 Drawing Sheets

BARBEQUE GRILL

BACKGROUND OF THE INVENTION

1. Field of the Invention

The present invention relates to a barbeque grill and warmer assembly, and more particularly, pertains to a barbeque grill assembly adapted to simultaneously cook one food and warm another.

2. Description of the Prior Art

The use of barbeque grills is known in the prior art. More specifically, barbeque grills which employ adjustable heating surfaces are known to consist basically of familiar, expected and obvious structural configurations, not withstanding the myrid of designs encompassed by the crowded prior art which have been developed for the fulfillment of countless objectives and requirements.

For example, U.S. Pat. No. 4,867,051 discloses a barbeque grill apparatus. The apparatus includes a plurality of arms which extend radially outwardly from a rotatable shaft. The arms each have a grill attached thereto such that when the shaft is rotated, each of the new grills will maintain a horizontal orientation.

U.S. Pat. No. 3,683,791 discloses a barbeque grill apparatus. The apparatus includes a ventilated housing which can be divided by a removable wall into two seperate cooking zones each of which contains a grill assembly.

U.S. Pat. No., 4,589,333 discloses a barbeque grill. The grill includes a drip pan and a heating basket mounted upon the drip pan.

U.S. Pat. No. Des. 304,010 discloses an ornamental design for a barbeque grill.

Yet another example is U.S. Pat. No. Des. 274,686 which discloses an ornamental design for a barbeque grill.

While these barbeque grills fulfill their perspective, particular objectives and requirements, the aforementioned patents do not describe a barbeque grill assembly which enables the simultaneous cooking of one food and warming of another. Additionally, the prior art barbeque grills do not illustrate a grill which includes two sets of racks with one set dedicated to warming food.

In this respect, the barbeque grill according to the present invention substantially departs from the conventional concepts and designs of the prior art, and in so doing provides a barbeque grill assembly adapted for simultaneously cooking one food and warming another.

Therefore, it can be appriciated that there exists a continuing need for new and improved barbeque grill which can be used to cook one food while warming another food. In this regard, the present invention substantially fulfils this need.

SUMMARY OF THE INVENTION

In view of the foregoing disadvantages inherent in the known types of barbeque grills now present in the prior art, the present invention provides an improved barbeque grill and warmer. As such, the general purpose of the present invention, which will be described subsequently in greater detail, is to provide a new and improved barbeque grill and warmer and method which has all the advantages of the prior art and none of the disadvantages.

To attain this, the present invention essentially comprises a barbeque grill assembly adapted for simultaneously cooking one food and warming another, the grill comprising, in combination, a base component having a rearward end, a forward end, and two side walls extending between the rearward and forward ends, an opened top, and a closed bottom, upper rack receiving means positioned upon the side walls, and lower rack receiving means positioned upon the side walls beneath the upper rack receiving means; a food rack adapted to be placed upon the upper rack receiving means of the base component; a charcoal rack adapted to be placed upon the lower rack receiving means of the base component; a lid component having an upper portion, a lower portion, a rearward end, a forward end, and two side walls extending between the forward and rearward ends, a closed top and an opened bottom, an oblong aperture formed within the upper half of the forward end of the lid component, a plurality of rectangular vents horizontally aligned and formed within the lower half of the rewarded end of the lid component, a pair of arcuate slots constituting rack receiving means positioned within each sidewall of the lid component; hinges interconnecting the rearward end of the base component to the rearward end of lid component; a handle positioned upon the forward end of lid component and serving to aid the pivoting of the lid component relative to the base component; a lower lid rack adapted to be received within the rack receiving means of the lid component; an upper lid rack adapted to be received within the rack receiving means of the lid component, the distance between the upper lid rack and the lower lid rack being determined by the height of the food items to be secured between the upper and lower lid racks, the volume between the upper and lower lid racks defining a warming zone; a lid door hinged to the oblong aperture of the lid component, the lid door serving to permit and prevent access to the warming zone, the lid door having a handle to facilitate its opening and closing; and a pedestal serving to support the grill assembly.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved barbeque grill and warmer which has all the advantages of the prior art barbeque grills and none of the disadvantages.

It is another object of the present invention to provide a new and improved barbeque grill and warmer which may be easily and efficiently manufactured and marketed.

It is a further object of the present invention to provide a new and improved barbeque grill and warmer which is of a durable and reliable construction.

An even further object of the present invention is to provide a new and improved barbeque grill and warmer which is susceptible of a low cost of manufacture with regard to both materials and labor, and which accordingly is then susceptible of low prices of sale to the consuming public, thereby making such barbeque grills economically available to the buying public.

Still yet another object of the present invention is to provide a new and improved barbeque grill and warmer which provides in the apparatuses and methods of the prior art some of the advantages thereof, while simultaneously overcoming some of the disadvantages normally associated therewith.

Still another object of the present invention is to provide a new and improved barbeque grill and warmer, adapted to simultaneously cook one food and warm another.

Yet another object of the present invention is to provide a new and improved barbeque grill and warmer, which provides two separate grilling zones, one for cooking, and one for warming.

Even still another object of the present invention is to provide a new and improved barbeque grill and warmer which allows one grilling zone to remain undisturbed while the other is checked on.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
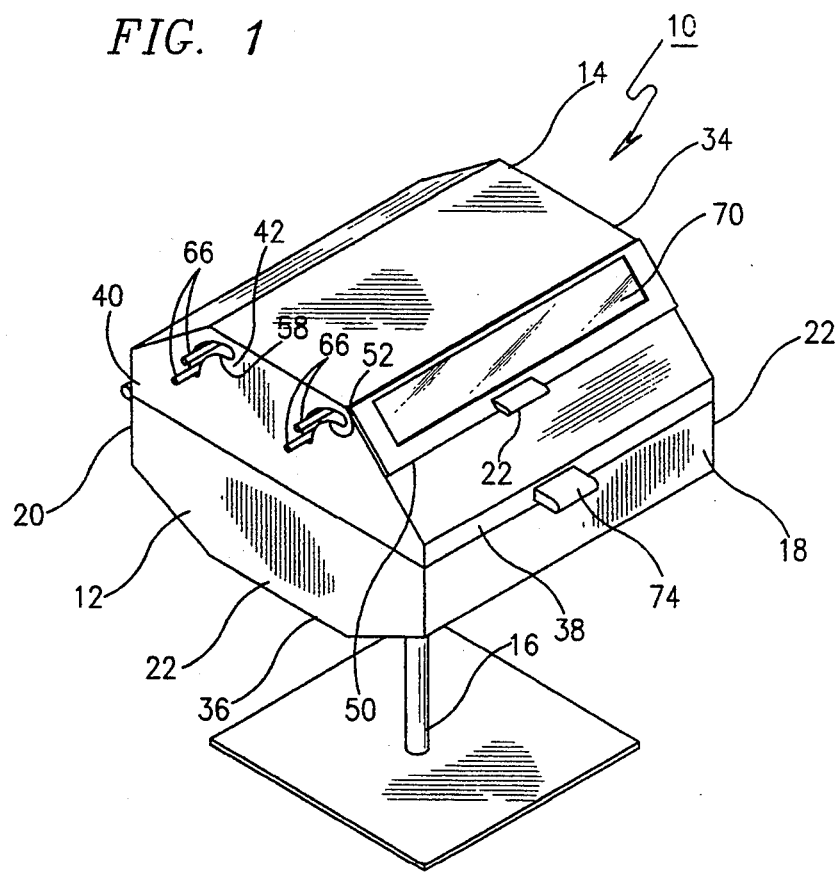
FIG. 1 is a perspective view of the barbeque grill and warmer in accordance with the first embodiment of the present invention.
Figure 2:
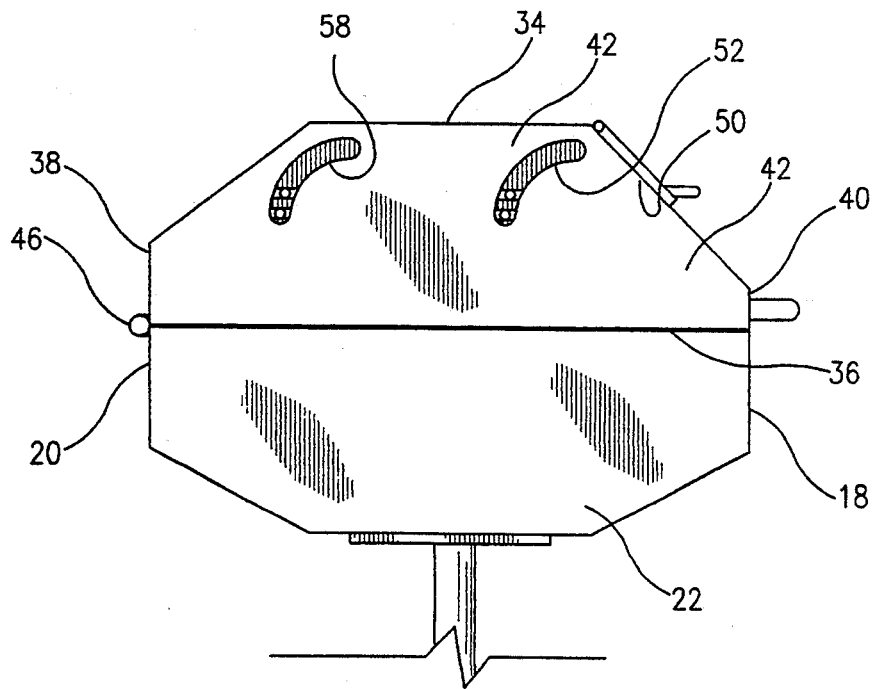
FIG. 2 is a side elevational view of the barbeque grill and warmer in accordance with the first embodiment of the present invention.

With reference now to the drawings, and in particular to FIG. 1 thereof, a new and improved barbeque grill embodying the principles and concepts of the present invention and generally designated by the reference numeral 10 will be described.

The present invention relates to a barbeque grill assembly adapted for simultaneously cooking one food and warming another. The barbeque grill assembly includes a base component 12 in which food is cooked, a lid component 12 in which food is warmed and a pedestal 16 therewith.

The base component 10 includes a rearward end 18, a forward end 20, and two side walls 22 extending between the rearward and forward ends. The base component further includes an opened top and closed bottom. The base component 12 is designed for holding charcoal and the food to be cooked by the charcoal in order to accomplish this, the base 12, includes a food rack 24, a charcoal rack 26, an upper and lower rack receiving means 28 and 30. The base component 10 may also be configured for cooking with gas.

The upper rack receiving means 28, includes a small ledge which extends along, and is positioned upon, each of the side walls. Likewise, the lower rack receiving means 30, includes a small ledge which extends along and is positioned upon each of the side walls. The lower rack receiving means is positioned upon the sidewalls beneath the upper rack receiving means 28.

A food rack 24 is adapted to be placed upon the upper rack receiving means 28. The food rack is dimensioned such that its side edges fit upon the ledges of the upper rack receiving means. Likewise, the charcoal rack 26 is adapted to be placed upon the lower rack receiving means 30, with the side edges of the charcoal rack dimensioned to fit upon the ledges of the lower rack receiving means. Thus, in use the charcoal placed upon the charcoal rack serves to cook food items placed upon the food rack. The spacing between two racks is selected to optimize the cooking of food placed upon the food rack.

The grill assembly 10 further includes a lid component 14. The lid component includes an upper portion 34, a lower portion 26, a rearward end 38, a forward end 40, and two side walls 42 extending between the forward and rearward ends. The lid component further includes a closed top and an opened bottom. Hinges 46, are employed to pivotally interconnect the rearward end of the base component to the rearward end of the lid component.

An oblong aperture 50 is formed within the upper half of the forward end of the lid component. The oblong aperture 50 enables a grill user to gain access to the upper portion of the lid component, as will be described in greater detail hereafter. In order to achieve proper ventilation, a number of horizontally aligned rectangular vents 56 are formed within the lower half of the rearward end of the lid component. In the preferred embodiment, five rectangular vents are preferably employed within the lid component.

As with the base component, the lid component includes rack receiving means. However, the rack receiving means of the lid component takes the form of two sets of arcuate apertures 56 & 58 with one set of arcuate apertures formed within each of the side walls of the lid component. An upper lid rack 62, and a lower lid rack 64 are adapted to be received within the rack receiving means. Each of the racks is of a standard rack construction with the upper lid rack including opposed sides, and two handles 66 extending from either of the sides. Likewise, the lower lid rack includes opposed sides, and two handles 66 extending from either of the sides.

Figure 3:
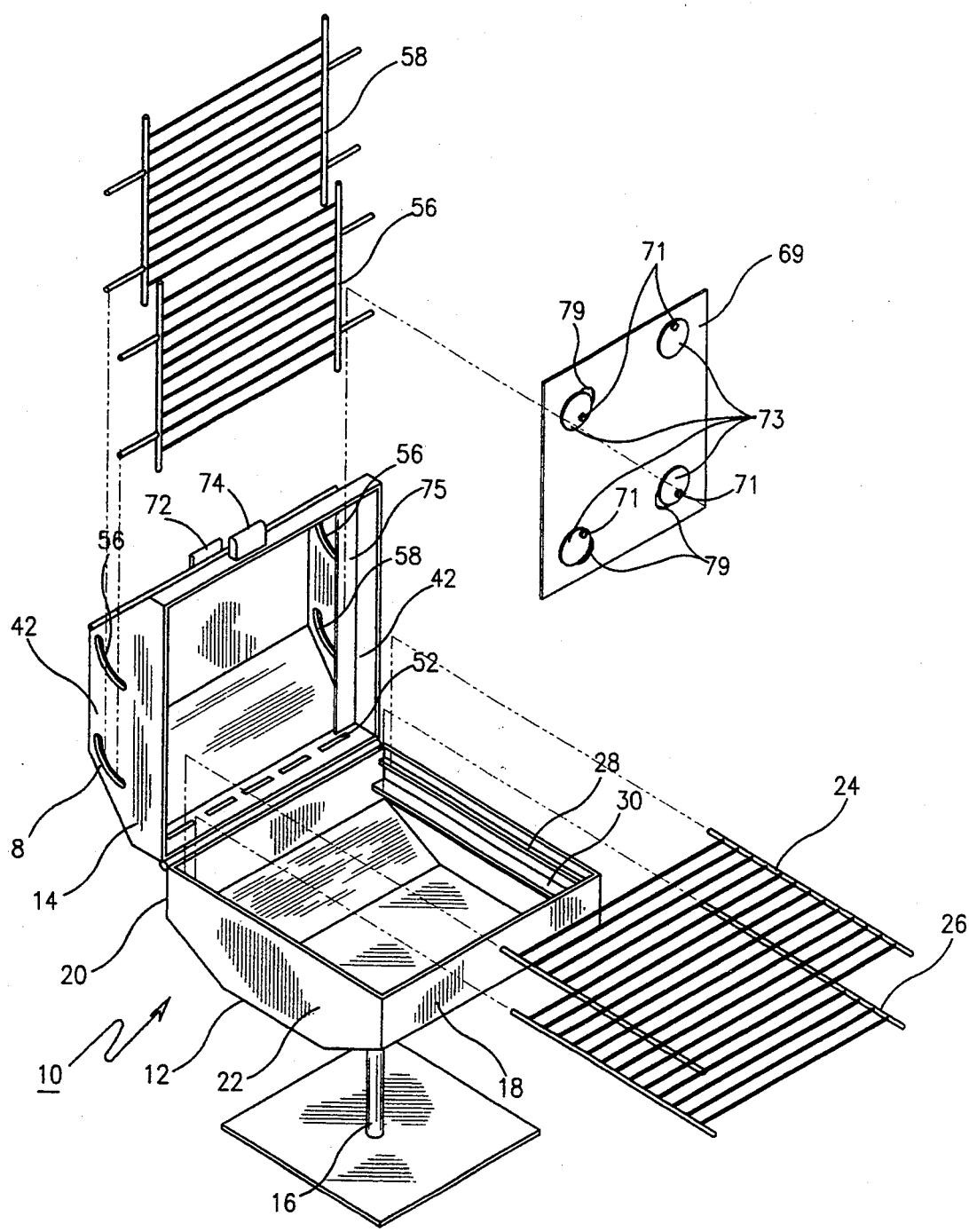
FIG. 3 is an exploded view of the barbeque grill and warmer of FIG. 1.
Figure 4:
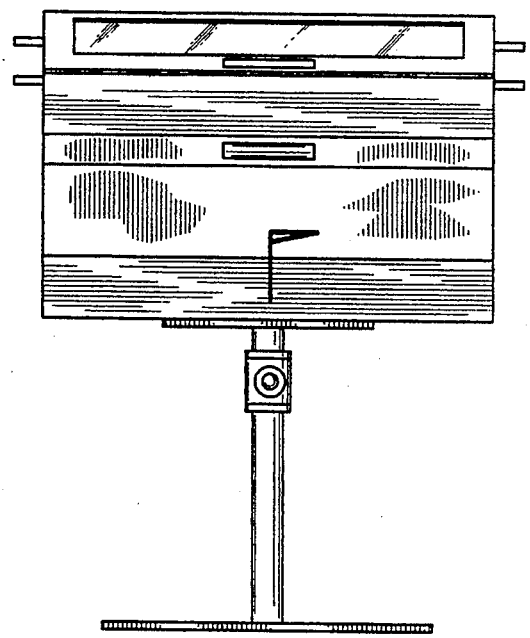
FIG. 4 is a front elevational view of the barbeque grill and warmer in accordance with the second embodiment of the present invention.
Figure 5:
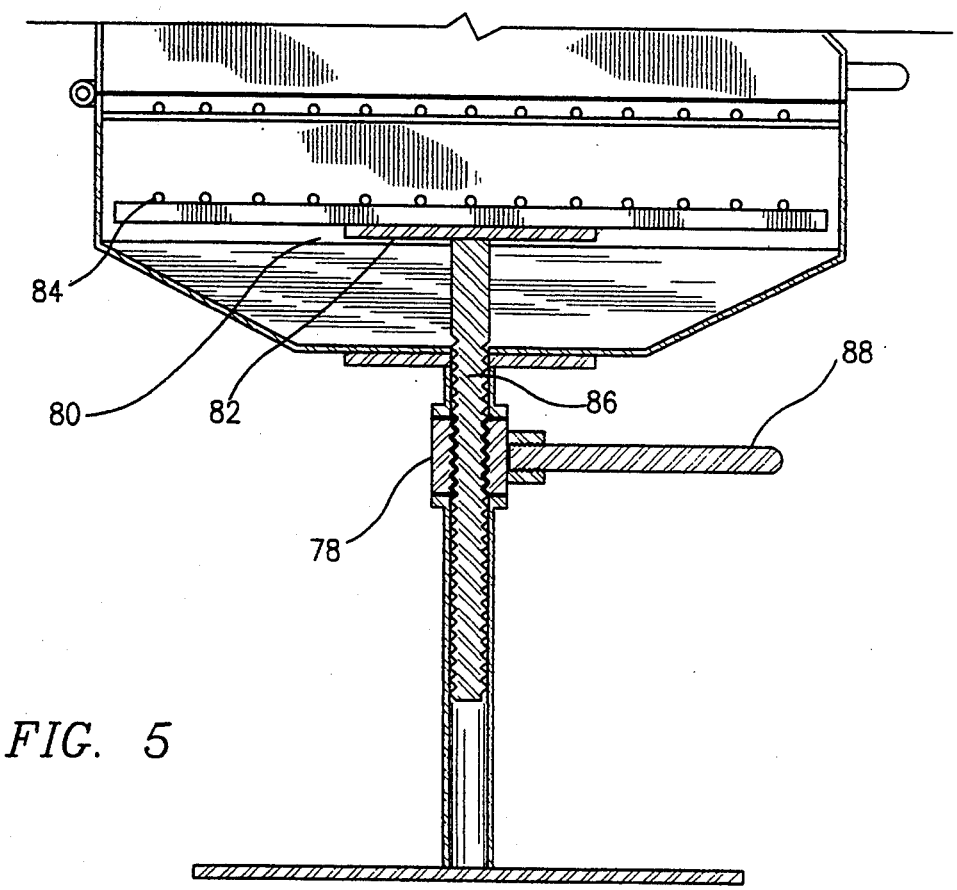
FIG. 5 is a sectional view taken along line 5—5 of FIG. 4.
Figure 6:
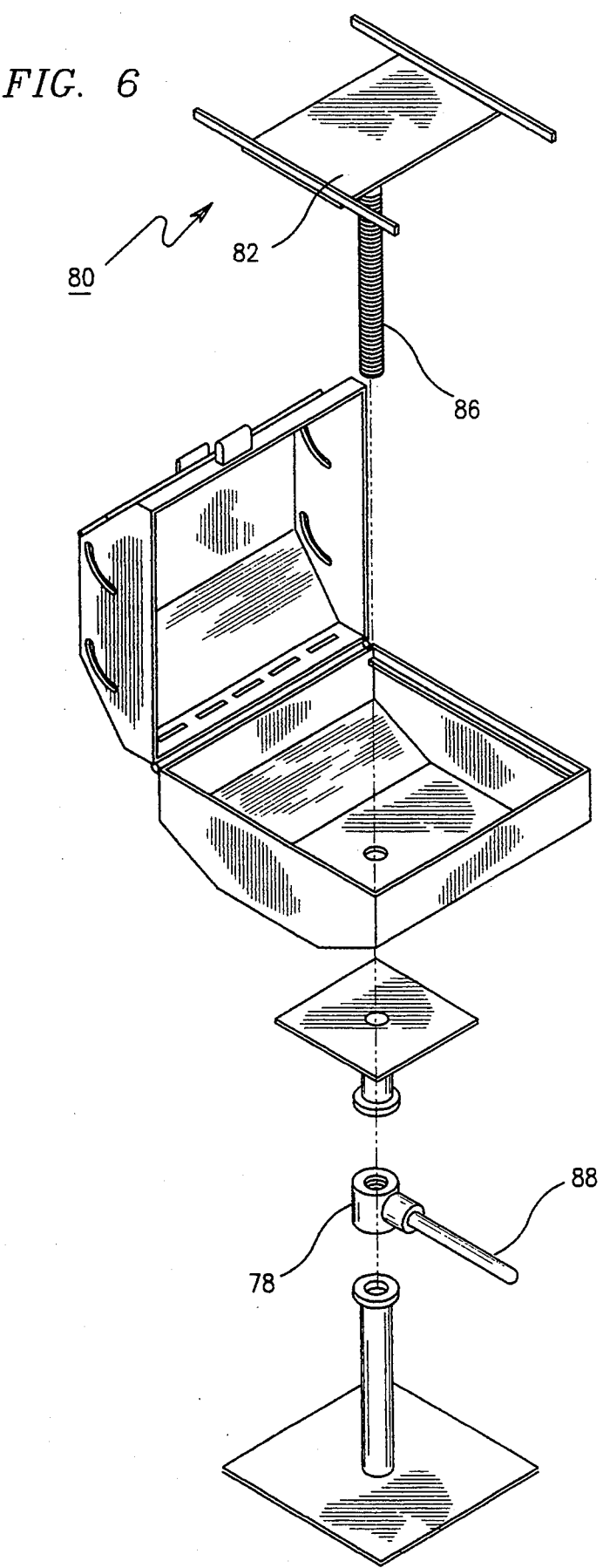
FIG. 6 is an exploded view of the barbeque grill of FIG. 4.

The spacing between the arcuate apertures on either side wall, and between the handles on either side of the lid racks, is such that the handles of the lid racks can be positioned within the arcuate apertures of the sidewalls. Thus, by moving the handles of either lid rack within the arcuate paths of the apertures, the height of either lid rack can be varied. Food items such as hamburger or hotdog buns can be placed upon the lower lid rack and then the upper lid rack can be set upon the food items to keep them securely in place. The purpose of the upper and lower lid racks is to create an area within the grill assembly dedicated to warming food items. The relationship of the upper lid handles over the lower lid handles is maintained whether the lid is in the opened or closed position. Compare FIGS. 1 and 3. Thus, the distance between the upper and lower lid racks is referred to as the warming zone. A lid door 70 is hinged to the oblong aperture 50 of the lid component 14 and serves to either permit or prevent access to the warming zone. The lid door includes a handle 72 to facilitate its opening and closing. In the preferred embodiment, the lid door is constructed of tempered glass. The use of a transparent lid door enables a user to view the warming zone and any food items secured between the upper and lower lid racks.

One final component of the grill 10 is a rectangular metal divider plate 69. Such plate 69 is located between the lower cooking region and the upper warming region. Its purpose is to keep the fire below from burning the bread, buns or other food thereabove. The heat from below heats the region above for food warming purposes only. The plate 69 has a plurality of circular holes 79 preferably adjacent to the corners of the plate. Such holes 79 are covered by circular plates 73 to the rectangular plate 69. As such, the circular plates may be individually rotated to open the holes to any desired extent. More or less heat may thus be provided to the upper warming region as a function of how much the holes 79 are opened or closed. The plate 69 is supported within the grill 10 by side support plates 75 on opposite sides of the lid 14. The plate 69, as well as the racks 56 and 58 thereabove, may be readily removed for cleaning or for cooking without such plate and racks.

Furthermore, a pedestal assembly 16 is connected to the closed bottom of the base component 12. The pedestal serves to support the grill assembly at an elevation convenient to the user.

In use, the operator grills food in a conventional manner upon the food rack of the base component. While the food is cooking, the operator may wish to warm certain food items within the warming zone. To accomplish this, the operator opens the lid door and places the food items to be warmed upon the lower lid rack. The upper lid rack is then positioned atop the food items to secure them in place. The lid door is then closed. In this manner the lid component can be raised without disturbing the contents of the warming zone, and the warming zone contents can be viewed through the transparent lid door.

In a second embodiment, the pedestal assembly 16 is hollow and includes an internally threaded handle section 78, rotatively coupled at an intermediate position along the length of the pedestal. The second embodiment further includes a charcoal rack support plate assembly 80. The plate assembly 80 includes an upper plate 82 section adapted to support the charcoal rack 84 of the base component. The assembly further includes an externally threaded post 86 centrally connected to the plate section. The post is adapted to be received within the hollow pedestal with the external threads of the post operatively engaging internal threads of the handle section. Thus, by rotating the threaded handle section 88 of the pedestal, the post 86, support plate 82 and charcoal rack 84, can be raised or lowered accordingly. This embodiment enables the user of the grill to selectively increase or decrease the space between the food rack and the charcoal rack.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in the size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A barbeque grill assembly adapted for simultaneously cooking one food and warming another, the grill comprising, in combination:

a base component having a rearward end, a forward end, and two side walls extending between the rearward and forward ends, an opened top, and a closed bottom, upper rack receiving means positioned upon the side walls, and lower rack receiving means positioned upon the side walls beneath the upper rack receiving means;

a food rack adapted to be placed upon the upper rack receiving means of the base component;

a charcoal rack adapted to be placed upon the lower rack receiving means of the base component;

a lid component having an upper portion, a lower portion, a rearward end, a forward end, and two side walls extending between the forward and rearward ends, a closed top and an opened bottom, an oblong aperture formed within the upper half of the forward end of the lid component, a plurality of rectangular vents horizontally aligned and formed within the lower half of the rewarded end of the lid component, a pair of arcuate slots constituting rack receiving means positioned within each sidewall of the lid component;

hinges interconnecting the rearward end of the base component to the rearward end of lid component;

a handle positioned upon the forward end of lid component and serving to aid the pivoting of the lid component relative to the base component;

a lower lid rack adapted to be received within the rack receiving means of the lid component;

an upper lid rack adapted to be received within the rack receiving means of the lid component, the distance between the upper lid rack and the lower lid rack being determined by the height of the food items to be secured between the upper and lower lid racks, the volume between the upper and lower lid racks defining a warming zone;

a lid door hinged to the oblong aperture of the lid component, the lid door serving to permit and prevent access to the warming zone, the lid door having a handle to facilitate its opening and closing; and a pedestal serving to support the grill assembly.

2. A barbecue grill assembly adapted for simultaneously cooking one food and warming another, the grill comprising:

a base component having an upper portion and lower portion, a rearward end, a forward end, and two side walls extending between the rearward and forward ends, an opened top, and a closed bottom, the base component having a charcoal rack positioned with its lower portion, the base component further having a food rack positioned above the charcoal rack;

a lid component having an upper portion, a lower portion, a rearward end, a forward end, and two side walls extending between the forward and rearward ends, a closed top and an opened bottom, rack receiving means in the form of arcuate slots positioned upon the side walls of the lid components;

an upper lid rack adapted to be received within the upper rack receiving means of the lid component; and a lower lid rack adapted to be received within the rack receiving means of the lid component, the distance between the upper lid rack and the lower lid rack being such that food items may be secured between the upper and lower lid racks, the space between the upper and lower lid racks defining a warming zone.

3. The barbeque grill assembly as set forth in claim 2 and further comprising:

a divider plate adapted to be received within the upper rack receiving means of the lid component beneath the lower lid rack.

4. The barbeque grill assembly as set forth in claim 2 and further including upper and lower rack receiving means on the side walls of the base component for supporting the racks.

5. The barbeque grill assembly as set forth in claim 2 and further comprising:

a hollow pedestal connected to the closed bottom of the base component, the pedestal having a internally threaded handle section rotatively coupled intermediate its length; and a charcoal rack support plate assembly having an upper plate section adapted to support the charcoal rack of the base component, the assembly also having an externally threaded post connected to the plate section, the post adapted to be received within the hollow pedestal with the external threads of the post operatively engaging the internal threads of the handle section whereby notation of the post will function to raise and lower the plate.

6. The grill assembly of claim 2 wherein:

the upper lid rack includes opposed sides, and two handles extending from either of the sides;

the lower lid rack includes opposed sides, and two handles extending from either of the sides; and the rack receiving means of the lid component includes two sets of arcuate apertures, with one set formed within each of the side walls, wherein the spacing between the arcuate apertures on either sidewall, and between the handles on either side of the lid racks enable the handles of the lid racks to be positioned within the arcuate apertures of the sidewalls, and wherein the arcuate path of the apertures enables the space between the two lid racks to be varied.

* * * * *